(No Model.)

P. H. BROWN.
ANT TRAP.

No. 567,076. Patented Sept. 1, 1896.

Witnesses:
Jerry Kingman.
F. M. Townsend.

Inventor:
Patrick Henry Brown
by
Hazard & Townsend
his attys.

UNITED STATES PATENT OFFICE.

PATRICK HENRY BROWN, OF REDLANDS, CALIFORNIA.

ANT-TRAP.

SPECIFICATION forming part of Letters Patent No. 567,076, dated September 1, 1896.

Application filed July 17, 1895. Serial No. 556,220. (No model.)

*To all whom it may concern:*

Be it known that I, PATRICK HENRY BROWN, a citizen of the United States, residing at Redlands, in the county of San Bernardino and State of California, have invented new and useful Improvements in Ant-Traps, of which the following is a specification.

My invention relates to that class of ant-traps in which two reversely-arranged conical walls are arranged to form a vessel which is adapted for entrapping those ants which have a small entrance to their nest, out of and into which they travel in going to and returning from their foraging expeditions.

The object of my invention is to produce a simpler and cheaper device of this kind which will excel the former traps in convenience and efficiency, being specially constructed for convenient discharge of the trapped insects and yet without movable parts.

One object of my invention is to so construct and arrange the parts as to allow the walls to be made at a greater inclination from the vertical, so that they will give an easier slope for the ascent of the insects and will also overhang the entrapping chamber at a more acute angle, thus to more effectually prevent the escape of the insects, and yet to do this without making the trap unwieldy in its size, but at the same time to provide walls of satisfactory height and a chamber of large dimensions, so as to insure the entrapping of large numbers of insects. I accomplish these objects by means of my invention, which comprises the combination of the base-plate provided with the central hole, an outwardly-sloping inner wall fastened to the base-plate and surrounding the hole and provided at its top with the surrounding horizontal outwardly-projecting ledge arranged in a horizontal plane, and an inwardly-sloping outer wall fastened to the base-plate and surrounding the inner wall and provided at its top with the horizontal inwardly-projecting ledge arranged outside of and wholly above the plane of the said outwardly-projecting ledge.

The accompanying drawings illustrate my invention.

Figure 1:
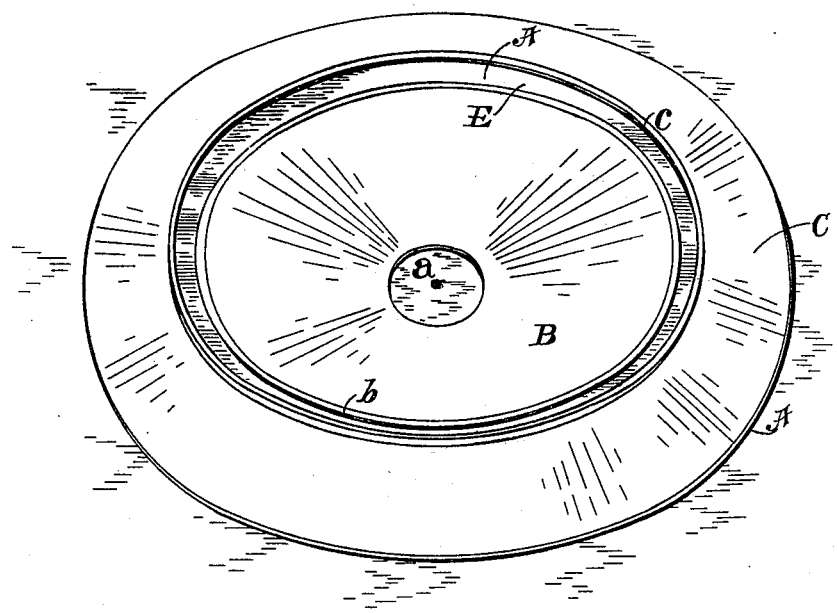
Figure 2:
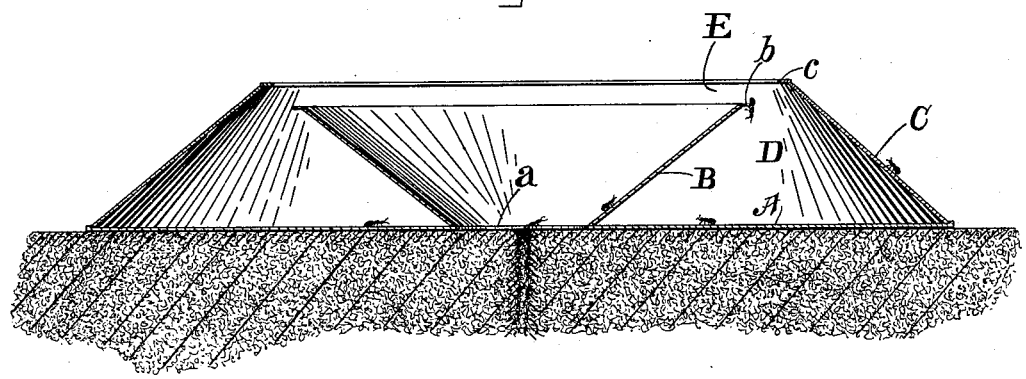

Figure 1 is a perspective view of my invention. Fig. 2 is a vertical mid-section of my newly-invented ant-trap in operation.

My invention comprises the combination of a centrally perforated base-plate A, an outwardly-sloping inner wall B, fastened to the upper face of the base-plate and extending upward therefrom, surrounding the hole $a$ in the base-plate and provided at its upper rim with a horizontal outwardly-projecting annular flange or ledge $b$, and an inwardly-sloping outer wall C, fastened to the rim of the base-plate around the inner wall and provided with the horizontal inwardly-projecting annular flange or ledge $c$, thus forming between the two walls and the base-plate an annular chamber D, which is open at the top and virtually triangular in cross-section. The top of the wall B is lower than the top of the wall C.

In practice the trap is set upon the ground with the margin of the hole $a$ surrounding the ant-hole. The ants will come out of the ant-hole and pass up the sloping inner wall B until they come to the ledge $b$, over which they will pass and fall into the chamber D. The walls B and C, which slope above such chamber, effectually prevent the ants from escaping.

If the trap is placed at the ant-hole after any ants have left the same on a foraging expedition, such ants, when returning, will pass up the outside of wall C, and over the ledge $c$, and into the chamber D, and thus become entrapped in the chamber D. My trap thus serves at one setting to catch all the ants which leave or try to return to the nest while the trap is set.

When caught in the trap, the ants may be destroyed by pouring hot water into the chamber D, or the trap may be held over a fire until the ants are overcome by the heat and fall out through the opening E between the tops of the walls B and C and thus into the fire.

The horizontal outer ledge $c$ is arranged considerably above the level of the ledge $b$ of the inner wall in order to allow a large opening through which, when the vessel is inverted, the mass of entrapped insects can be discharged, whether alive or after they have been destroyed by hot water. The horizontal ledges $b$ and $c$ afford no objectionable lodging-place to retain the insects when the vessel is inverted, and yet they serve to prevent any escape of insects which crawl down over their edges. The difference between the height of the outer and inner ledges allows a larger space between their rims, with traps of the same diameter and capacity, than would otherwise be possible, and there is no possibility of escape from the inside outward.

Now having described my invention, what I claim as new, and desire to secure by Letters Patent, is—

The ant-trap comprising the base-plate provided with the hole; the outwardly-sloping wall B fastened to the base-plate and provided at its top with the surrounding horizontal outwardly-projecting ledge b arranged in a horizontal plane; and the inwardly-sloping outer wall C fastened to the base-plate and surrounding the inner wall and provided at its top with the horizontal inwardly-projecting ledge c arranged in a horizontal plane wholly above the level of the said outwardly-projecting ledge b.

PATRICK HENRY BROWN.

Witnesses:
   NAT. A. BLAKE,
   CHAS. E. TRUESDELL.